United States Patent
Thiesson et al.

(10) Patent No.: US 6,922,660 B2
(45) Date of Patent: Jul. 26, 2005

(54) DETERMINING NEAR-OPTIMAL BLOCK SIZE FOR INCREMENTAL-TYPE EXPECTATION MAXIMIZATION (EM) ALGORITHMS

(75) Inventors: Bo Thiesson, Woodinville, WA (US); Christopher A. Meek, Kirkland, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 09/728,508

(22) Filed: Dec. 1, 2000

(65) Prior Publication Data

US 2002/0095277 A1 Jul. 18, 2002

(51) Int. Cl.[7] .............................................. G06F 17/10
(52) U.S. Cl. ......................... 703/2; 702/190; 704/240; 707/101
(58) Field of Search ............................ 702/190; 703/2; 704/240; 707/6, 101

(56) References Cited

U.S. PATENT DOCUMENTS

| | | | |
|---|---|---|---|
| 5,235,644 A | * | 8/1993 | Gupta et al. ................. 713/161 |
| 6,263,337 B1 | | 6/2001 | Fayyad et al. |
| 6,374,251 B1 | | 4/2002 | Fayyad et al. |
| 6,449,612 B1 | | 9/2002 | Bradley et al. |
| 6,622,117 B2 | * | 9/2003 | Deligne et al. .............. 702/190 |
| 6,691,087 B2 | * | 2/2004 | Parra et al. .................. 704/240 |
| 6,694,044 B1 | * | 2/2004 | Pavlovic et al. ............. 382/107 |

OTHER PUBLICATIONS

Thiesson, Meek, Heckerman, Accelerating EM for large databases, Microsoft Research Technical Report MSR–TR–99–31, May, 1999.

Radford M. Neal and Geoffrey E. Hinton, A view of the EM algorithm that justifies incremental, Sparse, and other variants, Learning in Graphical Models, pp. 355–371, Kluwer Academic Publishers, The Netherlands.

* cited by examiner

*Primary Examiner*—Albert W. Paladini
(74) *Attorney, Agent, or Firm*—Amin & Turocy, LLP

(57) ABSTRACT

Determining the near-optimal block size for incremental-type expectation maximization (EM) algorithms is disclosed. Block size is determined based on the novel insight that the speed increase resulting from using an incremental-type EM algorithm as opposed to the standard EM algorithm is roughly the same for a given range of block sizes. Furthermore, this block size can be determined by an initial version of the EM algorithm that does not reach convergence. For a current block size, the speed increase is determined, and if the speed increase is the greatest determined so far, the current block size is set as the target block size. This process is repeated for new block sizes, until no new block sizes can be determined.

35 Claims, 9 Drawing Sheets

FIG 3
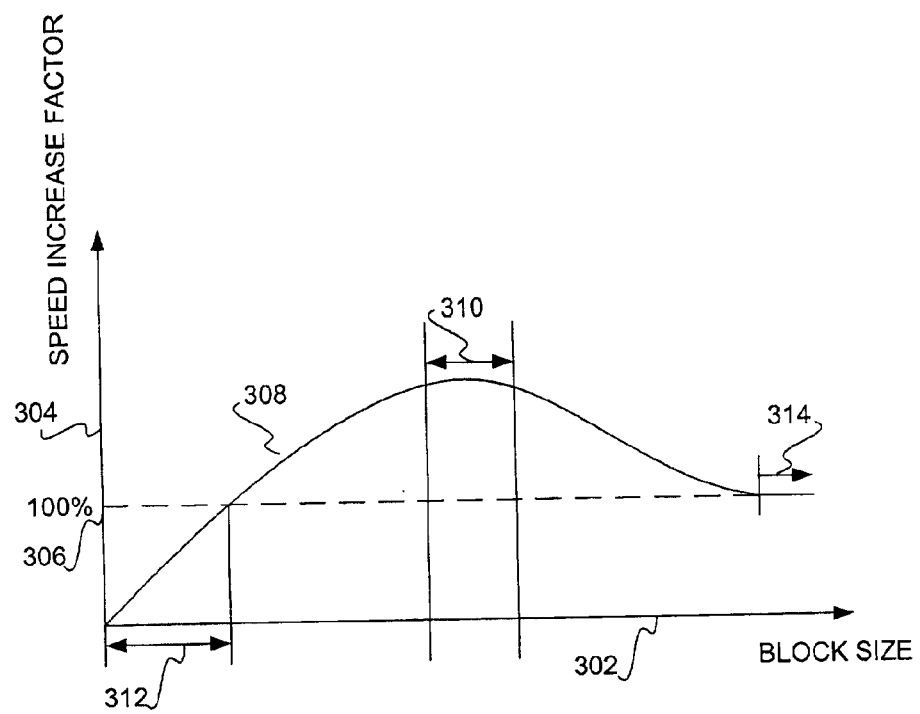
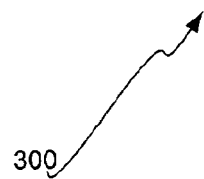

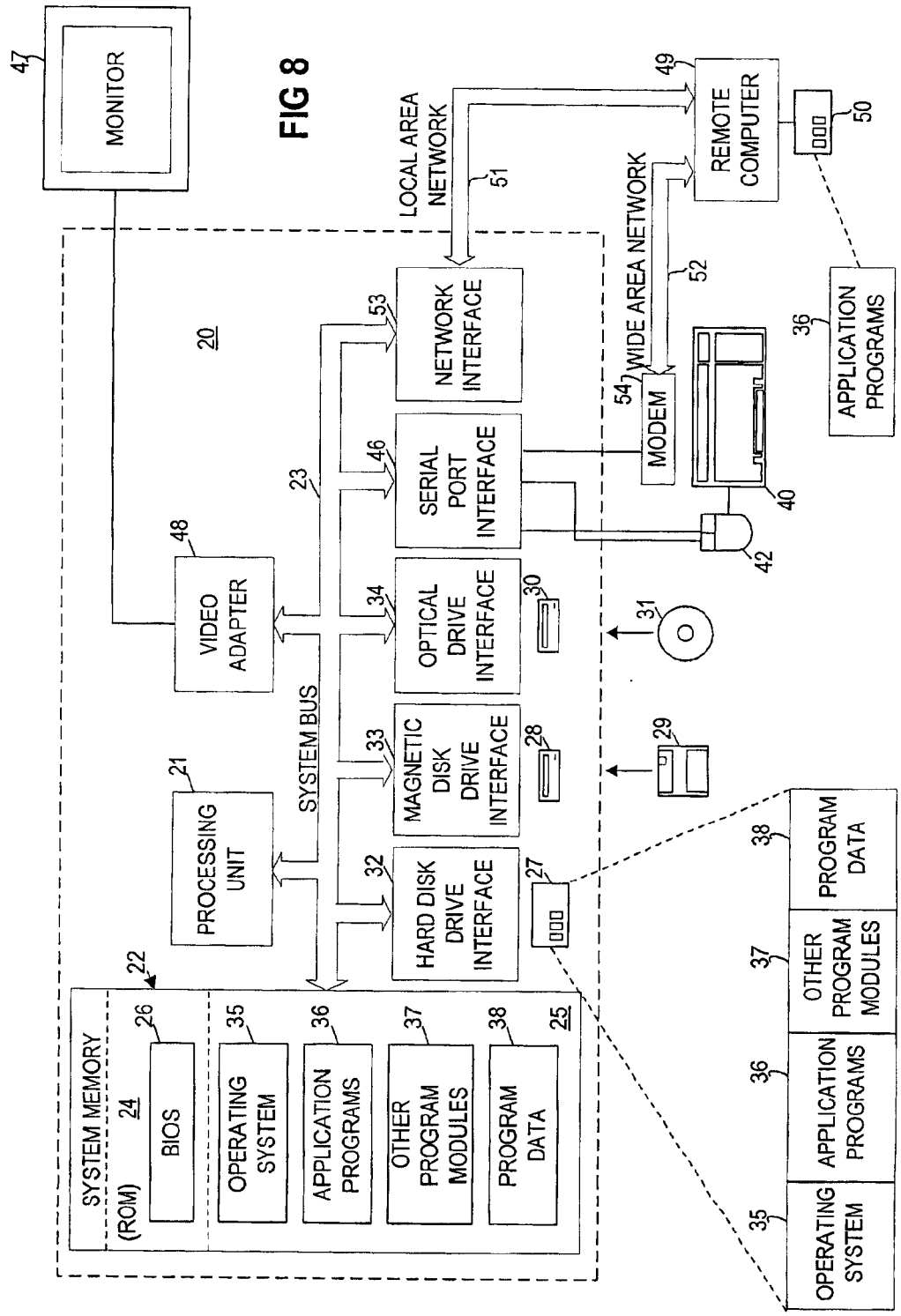

DETERMINING NEAR-OPTIMAL BLOCK SIZE FOR INCREMENTAL-TYPE EXPECTATION MAXIMIZATION (EM) ALGORITHMS

FIELD OF THE INVENTION

The invention relates generally to the expectation maximization (EM) algorithm, and more particularly to incremental-type EM algorithms that use data blocks resulting from a partition of the incomplete observed data.

BACKGROUND OF THE INVENTION

Large amounts of data are increasingly being collected for a wide variety of reasons. On the Internet alone, web browsing habits and electronic commerce activities of consumers result in large amounts of data that can be analyzed. For example, a web site operator may want to analyze data concerning the web browsing habits of its visitors to improve its web site and make the site more popular. As another example, an electronic commerce provider may want to analyze data concerning the purchases of consumers to increase its overall revenue and profit.

For such data to be analyzed, usually a statistical, probabilistic, or another type of model is constructed. In technical terms, after the type of model is selected, one or more model parameters are determined from the data. For a given type of model, the model parameters govern how the model operates with respect to the data. The data in this case can refer to observed data, as opposed to generated or unobserved data, because the data has been collected from real-world interactions. After being constructed, the resulting model is queried or otherwise used to provide desired answers regarding the data. Use of a model in this way is generally known as data mining.

Frequently, the observed data that is used to construct a model is incomplete. This means that for a number of records of the data, the values for one or more variables for some records are missing. For example, data concerning the web browsing habits of web site visitors may include records corresponding to the individual visitors. Each visitor ideally has indicated whether a given web page was visited by him or her. The variables correspond to the web pages for which visitation is being tracked. The variables may be binary, in that each of them has two possible values. The first value corresponds to the web page being visited, whereas the second value corresponds to the web page not being visited. For each visitor, there ideally is a value for each variable corresponding to the visitation or non-visitation of a given web page. However, where the data is incomplete, some of the visitors may have missing values for some of the variables.

Constructing a model from incomplete data is more difficult than constructing the model from data having no missing values. More technically, determining the parameters for a selected type of model is not easily accomplished from incomplete data. For this reason, an existing approach to model parameter estimation in light of the incomplete observed data may be used.

One well known approach to parameter estimation for incomplete data is the expectation maximization (EM) algorithm. The EM algorithm is described in detail in the reference Dempster et al., Maximum Likelihood from Incomplete Data via the EM Algorithm, Journal of the Royal Statistical Society, Series B, 39, 1–38 (1977). The EM algorithm is also referred to as the standard EM algorithm, and is outlined as the method 100 of FIG. 1. The algorithm includes two steps, an expectation step, or E-step (102), and a maximization step, or M-step (104). The EM algorithm is an iterative algorithm. For each iteration of 102 and 104, the algorithm improves the parameters. After each iteration, the algorithm determines whether a given convergence criterion has been satisfied (106). If the criterion has been satisfied, then the algorithm is done (108). Otherwise, the algorithm continues with another iteration (110, 102 and 104).

More technically, the EM algorithm estimates parameters, $\theta$, based on incomplete data, y. The EM algorithm is a maximization procedure for a function $f(\theta|y)$, where the actual function $f(\theta|y)$ depends on the type of estimation being performed. For example, for what is known as maximum likelihood estimation, the function is a log-likelihood function. For what is known as maximum a posterior estimation, the function is a log-posterior function.

In the E-step of 102, a conditional expectation is constructed based on the current estimated parameters and the incomplete observed data. That is, the E-step finds expected completions of the incomplete data given the current parameters to construct the conditional expectation for the complete data model under consideration. The expected completion, or conditional expectation, is known as the Q function. For the nth iteration, the Q function is mathematically written as $Q(\theta|\theta^n, y)$. This notation reflects that the Q function is a function of the parameters, $\theta$, and that it is constructed based on the current parameters, $\theta^n$, as well as the observed incomplete data, y.

In the M-step of 104, the conditional expectation is maximized to obtain new parameters. That is, the M-step maximizes the Q function with respect to the parameters, $\theta$, to obtain the parameters $\theta^{n+1}$ that are used in the next iteration. In FIG. 1, the setting of the current parameters to the new parameters is performed in 110 prior to the next iteration of the E-step in 102 and the M-step in 104.

A primary disadvantage to using the EM algorithm to obtain the parameters for a model from incomplete observed data is that it is not useful where the observed data is large. More technically, the EM algorithm is computationally impractical for large amounts of incomplete observed data. This is because the algorithm often requires many iterations before convergence is reached, with each iteration including an E-step. The time necessary to perform the E-step depends linearly on the number of records in the observed data. That is, as the amount of data increases linearly, the amount of time necessary to perform the E-step also increases linearly.

To overcome this disadvantage, incremental-type EM algorithms can alternatively be used. Incremental-type EM algorithms only perform the E-step for a small subset of the incomplete observed data, referred to as a block of data. The EM algorithm as a result becomes tractable even for large amounts of incomplete data. The most common incremental-type EM algorithm is known simply as the incremental EM algorithm. The incremental EM algorithm is described in detail in the reference Neal and Hinton, A View of the EM Algorithm that Justifies Incremental, Sparse, and Other Variants, in Learning in Graphical Models, Jordan (ed.), Kluwer Academic Publishers: The Netherlands, pp. 355–371 (1998).

However, other kinds of incremental-type EM algorithms also exist and are known, such as the forgetful EM algorithm. The forgetful EM algorithm is described in detail in the reference Nowlan, Soft Competitive Adaptation: Neural Network Learning Algorithms Based on Fitting Statistical Mixtures, Ph.D. thesis, School of Computer Science, Carnegie Mellon University, Pittsburgh (1991). It is also described in detail in the reference Sato and Ishii, On-line EM Algorithm for the Normalized Gaussian Network, Neural Computation, 12(2), 407–432 (2000).

The incremental EM algorithm is outlined as the method 200 of FIG. 2. The incremental EM algorithm first partitions the incomplete observed data into a number of blocks (202). The algorithm still includes an E-step (204), and an M-step (208). The algorithm is still iterative. For each iteration of 204, 206, and 208, the model parameters improve. After each iteration, the algorithm determines whether the convergence criterion has been satisfied (210). If the criterion has been satisfied, then the algorithm is done (212). Otherwise, the algorithm continues with another iteration of 204, 206, and 208.

More technically, in 202 the data, y, is partitioned into k blocks, $y_1, y_2, \ldots, y_k$. Preferably, the blocks are substantially the same size, although this is not necessary. The E-step in the nth iteration is performed in 204 with respect to a single block, $y_i$, i=n mod k. This results in the construction of an incremental conditional expectation given the current model parameters, referred to as the incremental Q function, or the IQ function, $IQ(\theta|\theta^n, y_i)$. This is the fraction of the conditional expectation of the incomplete data, the Q function, with respect to the single block, $y_i$. To determine the rest of the Q function, the IQ functions for the other blocks, $y_j, j \neq i$, previously determined are added in 206 to the IQ function just determined in 204.

The determination of the Q function in 206 can be written mathematically as:

$$Q(\theta|\theta^n, y) = IQ(\theta|\theta^n, y_i) + \sum_{j \neq i} IQ(\theta|\theta^{previous}, y_j). \quad (1)$$

The term $Q(\theta|\theta^n, y)$ in equation (1) is the Q function. The term $IQ(\theta|\theta^n, y_i)$ is the IQ function determined in 204. The term $$\sum_{j \neq i} IQ(\theta|\theta^{previous}, y_j)$$

is the sum of the IQ functions for the blocks other than that for which the IQ function was determined in 204 in the current iteration n. These IQ functions include the IQ function most recently determined for each of the other blocks. Therefore, $\theta^{previous}$ in $IQ(\theta|\theta^{previous}, y_j)$ refers to a particular one of the previous k−1 parameterizations for which the IQ function was determined. Note that until the current iteration n is greater than the number of blocks k, the IQ functions for blocks j>n are zero because they have not yet been determined.

The E-step of 204 thus iterates through the blocks of data cyclically. The M-step of 208 is performed as before, maximizing the conditional expectation to obtain new parameters. That is, the M-step of 208 maximizes the Q function constructed in 206 with respect to the parameters, θ, to obtain the new parameters, $\theta^{n+1}$, that are set as the current parameters in 214 and used in the next iteration. The E-step and M-step are repeated in successive iterations until the convergence criterion is satisfied.

The forgetful EM algorithm is similar to the incremental EM algorithm outlined as the method 200 of FIG. 2. The difference is that the Q function is not determined in 206 from a set of IQ functions, as indicated in equation (1). Rather, the Q function is determined as a decaying average of recently traversed data blocks. This is written mathematically as:

$$Q(\theta|\theta^n, y) = IQ(\theta|\theta^n, y_i) + \gamma \cdot Q(\theta|\theta^{n-1}, y') \quad (2)$$

In equation (2), y' is either all the incomplete data, or as much of the incomplete data as has been traversed so far. γ is the decay function. In performing the forgetful EM algorithm, the IQ functions do not need to be saved to determine the Q function, as they are in the incremental EM algorithm.

The incremental-type EM algorithms advantageously overcome the large data problem of the standard EM algorithm. They do this by partitioning the data into a number of blocks, and performing the E-step with respect to only one block of data in each iteration. However, the incremental-type EM algorithms do not provide guidance as to how the incomplete observed data should be initially partitioned into blocks. This means that to use one of the incremental-type EM algorithms a trial-and-error approach must usually be employed to determine the block size that yields sufficiently fast performance of the algorithm. Experience or intuition may govern the initial selection of the size of the blocks into which the data is partitioned, which can then be decreased or increased to learn whether algorithm performance is improved or worsened. Alternatively, the size of the blocks into which the data is partitioned may be initially and permanently set, without examining whether decreasing or increasing the size yields better algorithm performance.

Regardless of the exact prior art approach used to select the size of the blocks into which the incomplete observed data is partitioned, the process is less than ideal. If the statistician or other person responsible for constructing the model chooses the size of blocks poorly, perhaps due to inexperience, model construction will unnecessarily be slowed. Alternatively, the statistician or other person, even if experienced, may feel compelled to try many different block sizes, to yield the best performance of the selected incremental-type algorithm. This, too, causes model construction to be slowed. For these and other reasons, there is a need for the present invention.

SUMMARY OF THE INVENTION

The invention relates to determining the near-optimal block size for incremental-type expectation maximization (EM) algorithms. In other words, the invention relates to determining the near-optimal number of substantially the same size blocks for incremental-type EM algorithms. Preferably, each of the blocks resulting from partitioning of the incomplete data has the same size, except the last block, which may or may not have the same size. Block size is determined based on the novel insight that the speed increase resulting from using an incremental-type EM algorithm as opposed to the standard EM algorithm is near-optimal for a wide range of block sizes. Furthermore, an initial version of the EM algorithm, which does not reach convergence, has the same near-optimal speed increase for substantially the same range of block sizes. A near-optimal block size can be determined by examining different block sizes with the initial algorithm. Once a block size has been determined by using the initial algorithm, and the incomplete data appropriately partitioned into blocks of substantially this size, the incremental-type EM algorithm is then run to convergence.

One embodiment determines the near-optimal block size for the initial version of the EM algorithm. The speed increase that results from partitioning the incomplete data into blocks substantially of a current size is measured. If the speed increase is the greatest so far determined, then the current size is set as the target block size. A new block size is then determined, by using, for example, a line search algorithm. The process is repeated until no new block sizes can be determined. The incremental-type EM algorithm is then performed based on the target block size that resulted in the greatest speed increase for the block sizes tested.

Besides the embodiments, aspects, and advantages described in the summary, other embodiments, aspects, and advantages of the invention will become apparent by reading the detailed description and by referencing the drawings.

BRIEF DESCRIPTION OF THE DRAWINGS

FIG. 3 is a diagram showing the novel insight that governs block size selection of the invention.

FIG. 8 is a diagram of an example computerized device in conjunction with which the invention may be implemented.

DETAILED DESCRIPTION OF THE INVENTION

Figure 1:
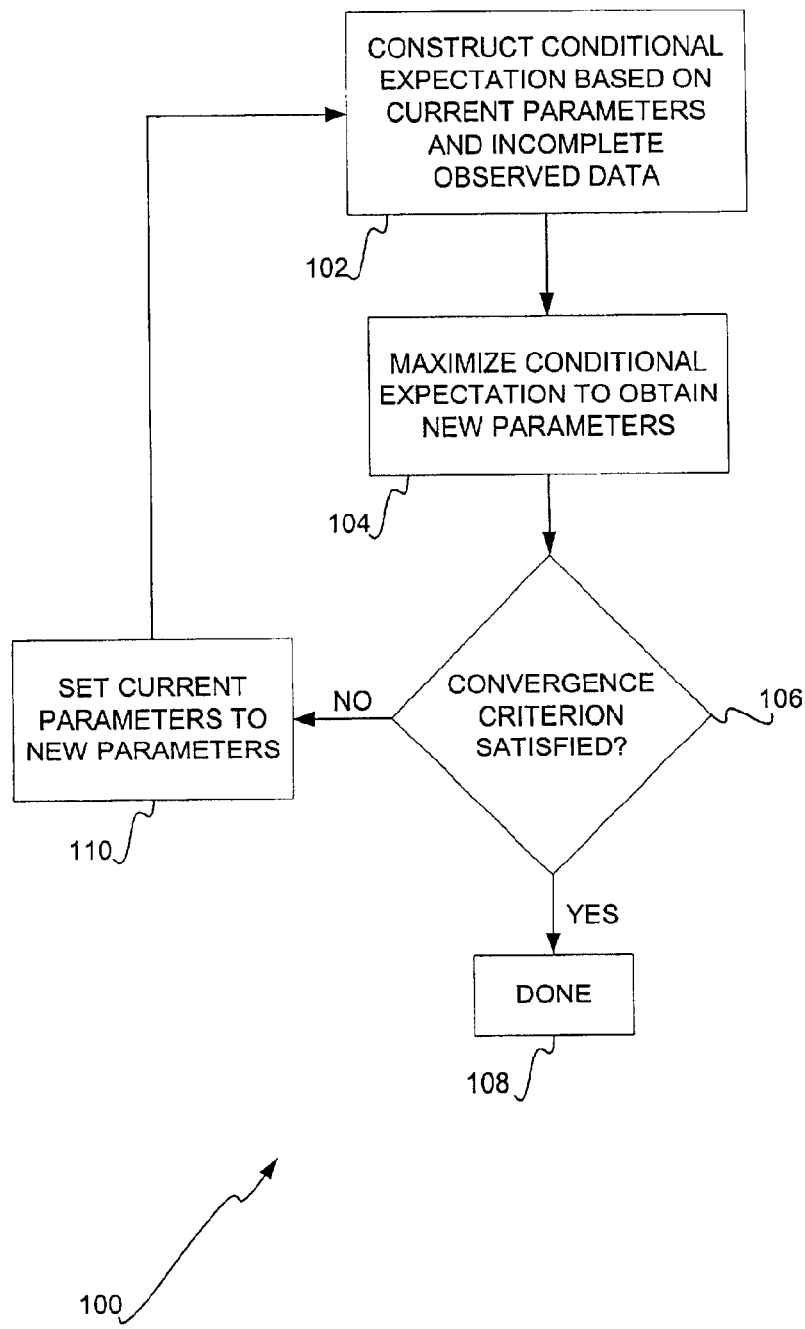
FIG. 1 is a flowchart of the expectation maximization (EM) algorithm known in the prior art.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

The novel insight governing selection of a target block size for partitioning incomplete data to run an incremental-type expectation maximization (EM) algorithm is shown in the graph 300 of FIG. 3. The x-axis 302 measures block size. The y-axis 304 measures a speed increase factor. The speed increase factor is the running time of the incremental EM algorithm after having partitioned the data in blocks, as compared to not partitioning the data and running the standard EM algorithm. As indicated by the curve 308, the optimal speed increase factor is reached when partitioning the data into blocks of a size within the range 310. The curve 308 is roughly flat within the range 310. This means that partitioning the data using a block size within the range 310 achieves a near-optimal speed increase. The range 310 is therefore referred to as the near-optimal range for block size.

The novel insight governing selection of a target block size is that preferably the target block size can be anywhere within the near-optimal range 310 to achieve a near-optimal speed increase. Furthermore, a block size within the near-optimal range can be determined by running an initial version of the incremental-type EM algorithm for alternative block sizes.

The graph 300 also shows that if the block size is too small, such as within the block size range 312, there is a speed decrease when running the incremental EM algorithm as compared to running the standard EM algorithm. Furthermore, if the block size is too large, such as within the block size range 314, the speed increase factor approaches 100%, as indicated by the arrow 306. This means that the running time of the incremental EM algorithm approaches that of the standard EM algorithm. Although the graph 300 is particular to the incremental EM algorithm, the same novel insight governs block size selection for other incremental-type EM algorithms. Such algorithms include the forgetful EM algorithm, for example.

Figure 4:
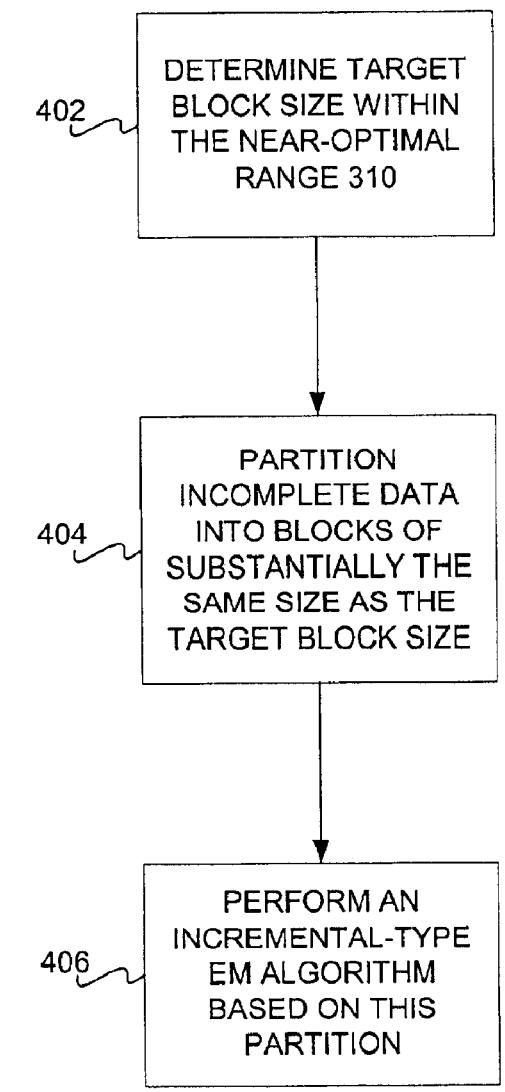
FIG. 4 is a flowchart of the overall approach to incremental-type EM algorithms followed by the invention.

The overall approach followed by the invention for performing an incremental-type EM algorithm is shown in the method 400 of FIG. 4. The target block size into which incomplete data is to be partitioned is determined within the near-optimal block size range 310 (402). The incomplete data is then partitioned into blocks of substantially the same size as the target block size (404). That blocks are of "substantially the same size" preferably means that all the blocks except the last block are of the same size. The last block has a size less than or equal to the size of the other blocks, depending on how many records remain in the data after the data has been partitioned into blocks.

Figure 5:
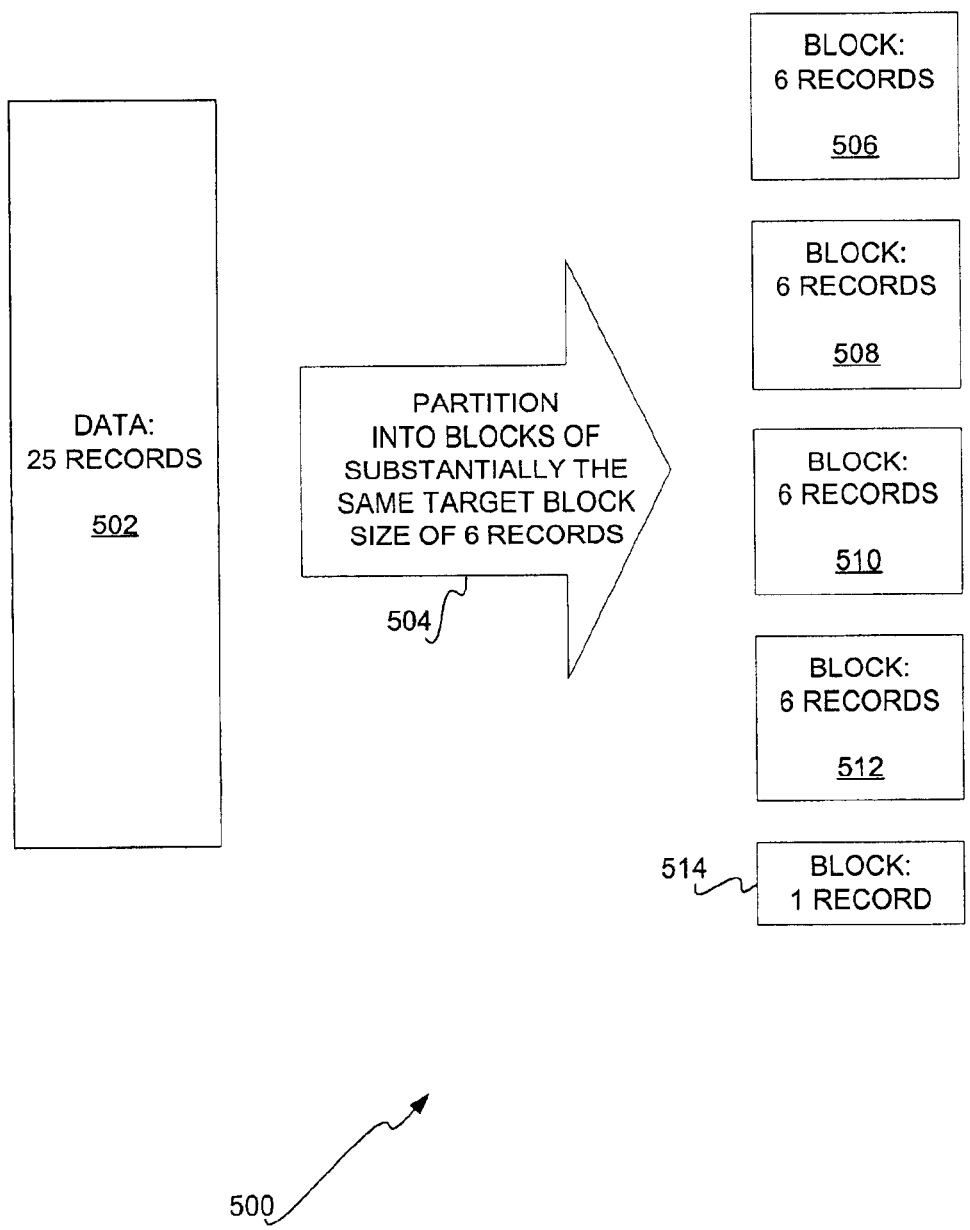
FIG. 5 is a diagram showing how one embodiment partitions data into a number of blocks of substantially near-optimal size.

An example of partitioning blocks into substantially the same size is shown in the diagram 500 of FIG. 5. The data 502 includes twenty-five records. As indicated by the arrow 504, the data is partitioned into blocks of substantially the same target block size of six records apiece. This means that the data 502 is partitioned into five blocks, the blocks 506, 508, 510, 512, and 514. Each of the blocks 506, 508, 510, and 512 has a size equal to the target block size of six records. Because only twenty-four of the twenty-five records of the data 502 are covered by the blocks 506, 508, 510, and 512, the last block 514 is necessary to include the final record of the data 502. Therefore, the last block 514 has a size of only a single record.

Figure 2:
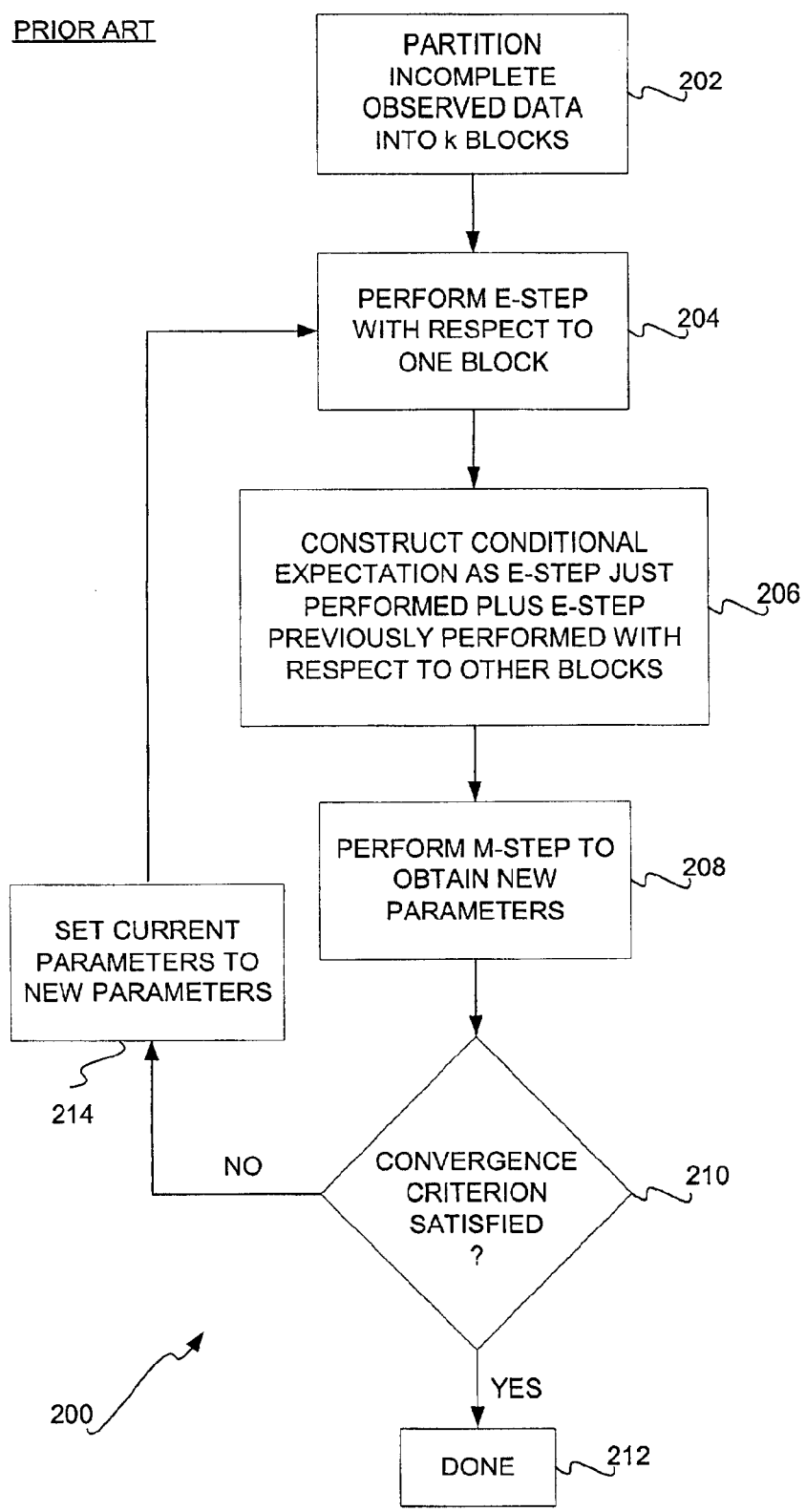
FIG. 2 is a flowchart of the incremental EM algorithm known in the prior art.

Returning to FIG. 4, after the incomplete data is partitioned, an incremental-type EM algorithm is performed based on this partition (406). The incremental-type EM algorithm can be the incremental EM algorithm, the forgetful EM algorithm, or a different incremental-type EM algorithm. For example, the incremental-type EM algorithm can be substantially the already described method 200 of FIG. 2, which outlines the incremental EM algorithm.

Figure 6:
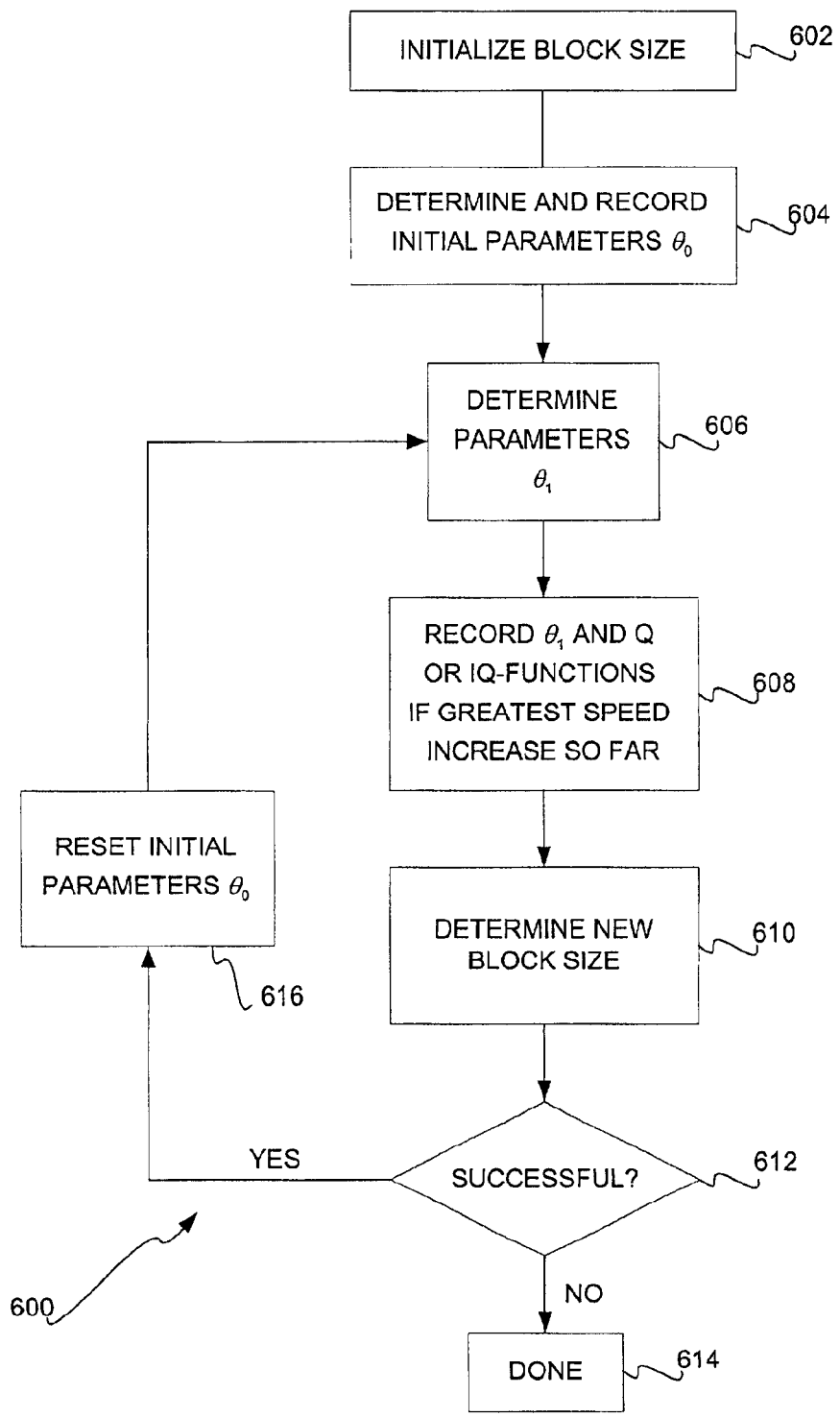
FIG. 6 is a flowchart showing generally how one embodiment determines near-optimal block size.

Approach to Determining Target Block Size Within the Near-optimal Range, Generally The approach to determining a target block size within the near-optimal range 310 is described generally by reference to the method 600 of FIG. 6. A more complete description of the approach is provided in the next section of the detailed description. The general description provided in this section does not divulge specific implementation details that may hamper comprehension. Once the approach is understood, the more complete description provides the specific details for implementing the approach. The method 600 specifically is the manner by which one embodiment determines the target block size, and partitions the incomplete data into blocks of substantially this size prior to running an incremental-type expectation maximization (EM) algorithm. An overall summary of the method 600 is provided in the next paragraph, followed by a more detailed description of the method 600.

The method 600 determines the target block size by effectively performing the specific incremental-type EM algorithm being used with one or more passes through the incomplete data for a number of different block sizes. This is as opposed to running the specific EM algorithm completely to convergence. The target block size is first initialized (602). The initial parameters, $\theta_0$, are determined as is customary for the incremental-type EM algorithm being used (604). Likewise, the parameters, $\theta_1$, are also determined as is customary for the algorithm being used (606). However, the parameters, $\theta_1$, are redetermined for a number of different block sizes. Where the parameters, $\theta_1$, result in the greatest speed increase, these parameters, and the Q- or incremental Q-(IQ-) functions resulting from determining the parameters, are recorded (608). These Q- or IQ-functions correspond to partitioning the data into blocks of substantially the target block size that results in the greatest speed increase in performing the algorithm. Once determining a new block size (610) is unsuccessful (612), the method 600 is finished (614). Otherwise, the initial parameters are reset (616), and the method 600 repeats beginning at 606.

More specifically, first the block size is initialized (602), and the initial model parameters, $\theta_0$, are determined and recorded (604). The block size is initialized preferably to a value that is appropriate for later performance of a one-dimensional search technique, as will be described. The initial model parameters are determined based on the specific incremental-type EM algorithm used, and the specific function, $f(\theta|y)$, that is being maximized by the algorithm, where y refers to the incomplete data.

The next iteration of the model parameters, $\theta_1$, is then determined, also based on the specific algorithm being used, and the specific function that is being maximized (606). This involves constructing a Q- or a number of IQ-functions, depending on the incremental-type EM algorithm being performed. For example, for the incremental EM algorithm, determining the model parameters involves constructing a number of IQ-functions. Conversely, for the forgetful EM algorithm, this involves constructing a decaying Q-function.

Determining the model parameters is preferably performed by a single pass of the specific incremental-type EM algorithm being used through the incomplete data. That is, both the expectation step, or E-step, and the maximization step, or M-step, are performed for the incomplete data. Where the block size has been initialized such that there are k blocks of data after partitioning the incomplete data, k iterations of the incremental-type EM algorithm are performed as a single pass. Alternatively, a number of passes are performed through the incomplete data. This number of passes is preferably smaller than the number of passes that would be expected to completely perform the incremental-type EM algorithm being used. Performing a number of passes, instead of a single pass, incurs the cost of increased running time of the method 600. Another alternative is to run a number of passes through the data until a given convergence criterion has been satisfied. This criterion is more quickly satisfied than the convergence required by the EM algorithm itself, and is therefore referred to as a rough convergence criterion.

If determination of the model parameters results in the greatest speed increase so far encountered, then these parameters and the Q- or IQ-functions resulting from determining these parameters are recorded (608). The speed increase is measured preferably by the ratio:

$$\frac{f(\theta_1 | y) - f(\theta_0 | y)}{t_1 - t_0}. \quad (3)$$

In the fraction (3), $t_1$ refers to the running time to determine the parameters, $\theta_1$, whereas $t_0$ refers to the running time to determine the parameters, $\theta_0$. That is, $t_0$ is the time taken to perform 604, whereas $t_1$ is the time taken to perform 606. The numerator of the fraction (3) essentially determines the accuracy of the function when using the parameters, $\theta_1$, as compared to the parameters, $\theta_0$. Therefore, the ratio measures the speed of the algorithm as the improvement in accuracy of the algorithm compared to its running time.

A new block size is then determined (610). Preferably, this is accomplished by using a known one-dimensional search algorithm, which in this case maximizes the speed as a function of block size. Such one-dimensional search algorithms include the golden section search, the dicotomic search, and the Fibonacci search. A one-dimensional search algorithm generally finds a local maximum or minimum, bracketed within an interval. For example, for the triple a, b, c, the local maximum is at b within the interval (a, c).

Determination of the new block size may or may not be successful (612). If successful, this means that the new block size is different, or substantially different, from the previous block size. If unsuccessful, this means that the new block size is equal, or substantially equal, to the previous block size. For example, the local maximum may have been reached, such that running the one-dimensional search algorithm yields the same block size. As another example, if a given degree of precision has been specified, then the new block size may be different than the previous block size, but within the given degree of precision. In either of these cases, it is said that determining a new block size is unsuccessful.

If determining a new block size is successful, then method 600 resets the initial parameters, $\theta_0$ (616). The method 600 then repeats determining parameters $\theta_1$ (606), recording these parameters and the Q- or IQ-functions if the greatest speed increase so far has resulted (608), and determining another new block size (610). This process continues until determining a new block size is unsuccessful. Once determining a new block size is unsuccessful, the method 600 is finished (614). The target block size is the block size that resulted in the greatest speed, and hence the greatest speed increase over the standard EM algorithm. The incremental-type algorithm then continues using the partition of the incomplete data into the blocks of this size that is implicit in the Q- or IQ-functions that have been recorded. In other words, the incremental-type EM algorithm continues from the parameterization and with the Q- or IQ-functions that resulted in the greatest speed increase.

The method 600 may require a number of iterations to achieve the local maximum that results from an unsuccessful new block size determination. In cases where the incomplete data is large, this may require a significant amount of time. To alleviate this problem, the method 600 can alternatively be performed on only a subset of the incomplete data. Once the target block size has been determined, the incremental-type EM algorithm continues, with a partitioning of all the incomplete data into blocks of substantially the same target block size.

However, the data blocks for which the target block size is determined and the data blocks for which the incremental-type EM algorithm is to continue after the target block size is determined may be incompatible. This can occur, for instance, where a random sample of the data is used for determining the target block size. In such cases, the incremental-type EM algorithm is continued from the parameters, $\theta_1$, but with the Q- or IQ-functions that resulted in the greatest speed increase set to zero. For determining the target block size, any subset of the incomplete data can be selected. Preferably, however, either a sequence of the first records of the data is selected, or a random sample of the data is used. The random sample should be larger than the various sizes of the blocks of data being considered.

A difficulty with performing an incremental-type algorithm generally, and hence with performing the method 600, is that a problem referred to as the starvation problem may occur. The starvation problem results when the first block of data is not sufficiently large to avoid incorrect model parameters from being determined in the first M-step. Incorrect model parameters may in a following E-step divide all the data such that the entire subset is located in one or more groups, whereas one or more other groups are completely empty of data. This trend will then continue throughout performance of the algorithm. The starvation problem can be avoided by performing a fractional or full pass through a larger part or all of the incomplete data before performing the first M-step. One embodiment performs this first fractional or full pass through the data when determining block size, to avoid the starvation problem. Another embodiment, however, does not do so. Instead, for a particular block size, the initial Q- or IQ-functions obtained before the first M-step are efficiently determined from the initial Q- or IQ-functions previously determined for a smaller block size.

Approach to Determining Target Block Size, More Completely

Figure 7A:
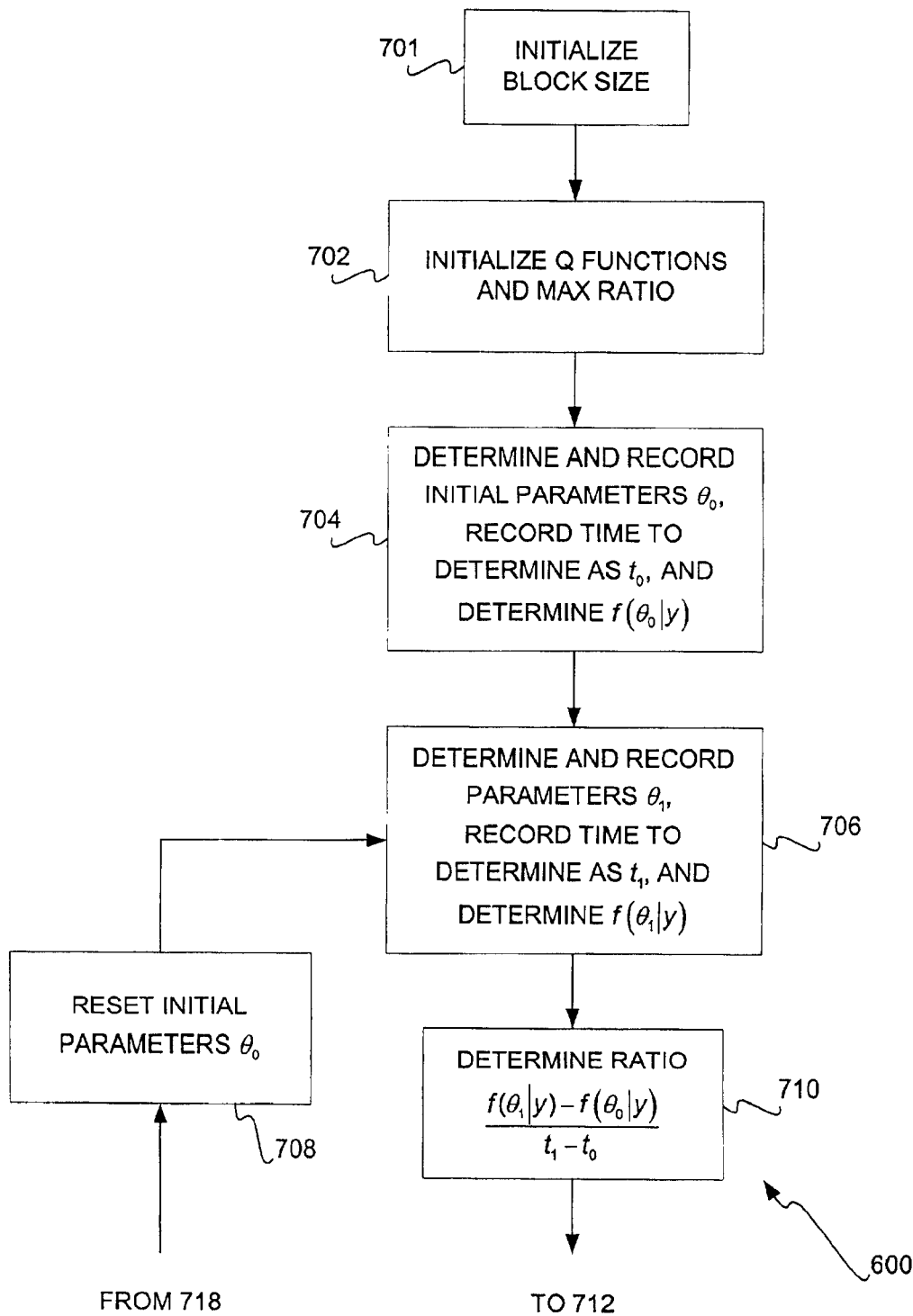
FIGS. 7A and 7B are flowcharts showing more particularly how the embodiment of FIG. 6 determines near-optimal block size.
Figure 7B:
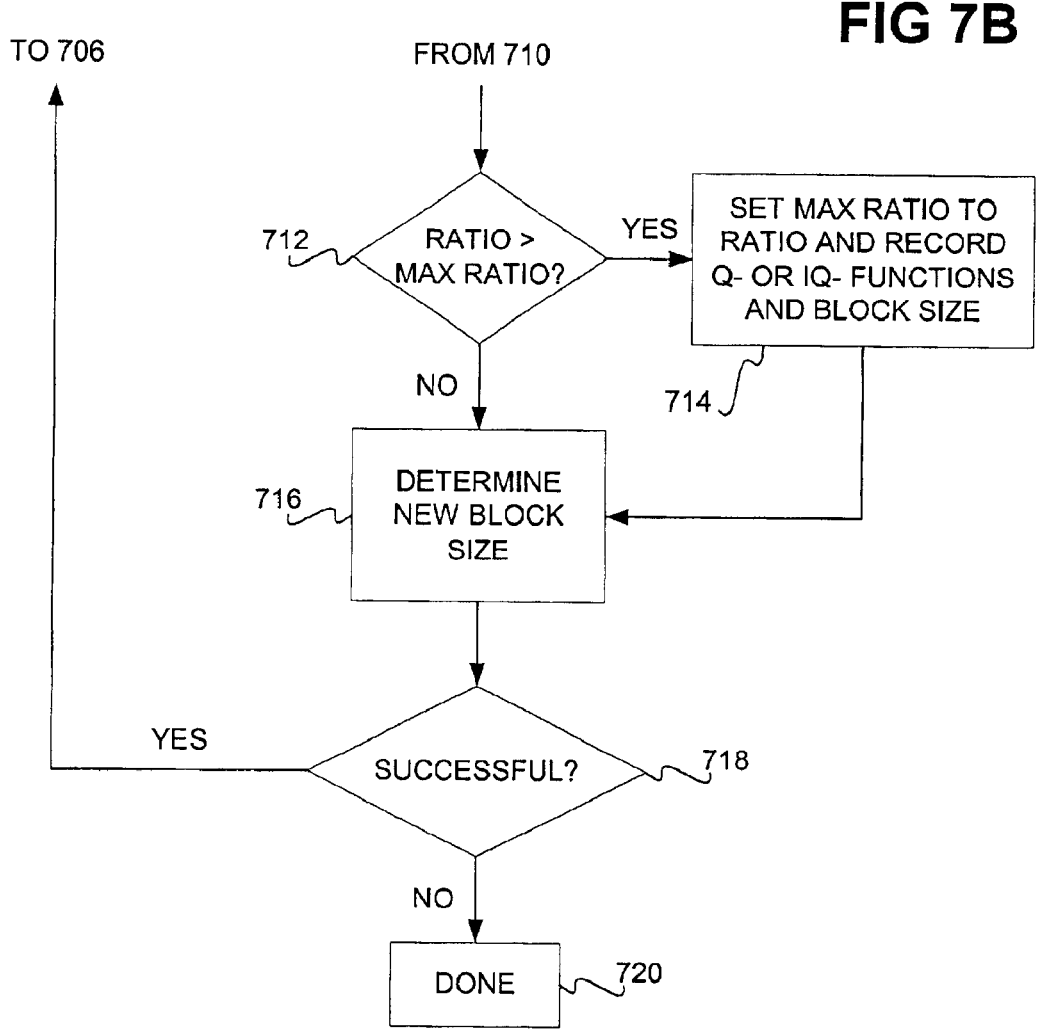

The approach for determining a target block size within the near-optimal range 310 is described more completely by reference to FIGS. 7A and 7B. FIGS. 7A and 7B show the method 600 of FIG. 6, but with implementation details added. The explanation and alternative embodiments discussed in the previous section of the detailed description are still applicable to the description of the method 600 in this section. They are not repeated to avoid redundancy.

The block size is first initialized (701), preferably to a value that is appropriate for later performance of the one-dimensional search technique. Both the Q- or IQ-functions and a maximum ratio are then initialized to zero (702). The initial parameters, $\theta_0$, are determined as is customary for the incremental-type EM algorithm being used, and the parameters are recorded (704). The specific function, $f(\theta|y)$, that is being maximized by the algorithm, where y refers to the incomplete data, is determined relative to the initial parameters, and the time taken to determine the initial parameters is also recorded, as $t_0$ (704).

The parameters, $\theta_1$, are next determined as is customary for the incremental-type EM algorithm being used, and the time taken to determine these parameters is recorded, as $t_1$ (706). The specific function, $f(\theta|y)$, that is being maximized by the algorithm, where y refers to the incomplete data, is also determined relative to the parameters, $\theta_1$ (706). The following ratio is then determined (710):

$$\frac{f(\theta_1 \mid y) - f(\theta_0 \mid y)}{t_1 - t_0}. \quad (4)$$

The ratio of the fraction (4) is identical to the ratio of the fraction (3), and is repeated here for explanatory clarity. In the fraction (4), $f(\theta_0|y)$ serves as a baseline. Where the incomplete data set, y, is very large, the baseline can be approximated. For example, the specific function being maximized can be evaluated on a subset of the data and the result scaled according to the difference between the size of this subset and the size of the subset used when determining $f(\theta_1|y)$.

The ratio is compared with the maximum ratio (712), which was already initially set to zero. If the ratio is greater than the maximum ratio, then the maximum ratio is set to this ratio, and the block size and the Q- or IQ-functions are recorded, or saved (714). Regardless of whether the ratio is greater than the maximum ratio, a new block size is determined (716), preferably by using a known one-dimensional search algorithm. As before, determination of the new block size may or may not be successful (718). If successful, this means that the new block size is different, or substantially different, from the previous block size. If unsuccessful, the new block size is equal, or substantially equal, to the previous block size.

If determining a new block size is successful, then the method 600 resets the initial parameters, $\theta_0$, as have been previously recorded (708), and then repeats the following. The parameters, $\theta_1$, and the function $f(\theta_1|y)$ are redetermined (706). The ratio of the fraction (3) is also redetermined (710). The ratio is compared to the maximum ratio (712), and the Q- or IQ-functions are recorded if the ratio is greater than the maximum ratio (714). Finally, another new block size is determined (716). This process continues until determining a new block size is unsuccessful.

Once determining a new block size is unsuccessful, the method 600 is finished (720). The target block size is the block size that was most recently recorded in 714. The incremental-type algorithm continues using the partition of the incomplete data into the blocks of this size that is implicit in the Q- or IQ-functions that were most recently recorded in 714. In other words, the incremental-type EM algorithm continues with parameters $\theta_1$ and the Q- or IQ-functions that resulted in the greatest speed increase.

EXAMPLE

Computerized Device

The invention can be implemented within a computerized environment having one or more computerized devices. The diagram of FIG. 8 shows an example exemplary system for implementing the invention that includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25.

A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The methods that have been described can be computer-implemented. A computer-implemented method is desirably realized at least in part as one or more programs running on a computer. The programs can be executed from a computer-readable medium such as a memory by a processor of a computer. The programs are desirably storable on a machine-readable medium, such as a floppy disk or a CD-ROM, for distribution and installation and execution on another computer. The program or programs can be a part of a computer system, a computer, or a computerized device.

CONCLUSION

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A method for modeling incomplete data comprising:
   determining a target block size for an incremental-type expectation maximization (EM) algorithm, the target block size within a target block size range that minimizes running time of the incremental-type EM algorithm;
   partitioning the incomplete data into a number of blocks of a size substantially equal to the target block size; and,
   performing the incremental-type EM algorithm, based on the number of blocks into which the incomplete data has been partitioned, to obtain parameters for modeling the incomplete data.

2. The method of claim 1, wherein determining the target block size comprises:
   determining initial model parameters;
   initializing a new block size; and,
   repeating:
      setting a current block size to the new block size;
      determining current model parameters based on partitioning the incomplete data into a number of blocks of a size substantially equal to the current block size;
      determining a speed increase that results from using the current model parameters with the incremental-type EM algorithm as compared to the initial model parameters with the incremental-type EM algorithm;
      setting the target block size to the current block size if the speed increase is a greatest speed increase determined so far;
      redetermining the new block size;
      resetting the initial model parameters,
   until the new block size substantially equals the current block size.

3. The method of claim 2, wherein the current model parameters are determined by performing a single pass through the incomplete data.

4. The method of claim 2, wherein the current model parameters are determined by performing a number of passes through the incomplete data.

5. The method of claim 2, wherein the current model parameters are determined by iterating through the incomplete data until a convergence criterion has been satisfied.

6. The method of claim 2, wherein the current model parameters are determined by using all the incomplete data.

7. The method of claim 2, wherein the current model parameters are determined by using a sample of the incomplete data larger than the target block size.

8. The method of claim 2, wherein determining the speed increase comprises determining a ratio of a function using the current model parameters minus the function using the initial model parameters over a running time for determining the current model parameters minus a running for determining the initial model parameters.

9. The method of claim 8, wherein the function is a function to be maximized by using the incremental-type EM algorithm.

10. The method of claim 8, wherein the function is one of: a log-likelihood function, and a log-posterior distribution function.

11. The method of claim 2, wherein redetermining the new block size comprises using a line search algorithm.

12. The method of claim 11, wherein the line search algorithm is one of: a golden section search algorithm, a dicotomic search algorithm, and a Fibonacci search algorithm.

13. The method of claim 1, wherein the number of blocks, except a last block of the number of blocks, has the target block size, and the last block has a size less than the target block size.

14. The method of claim 1, wherein the incremental-type EM algorithm is one of: the incremental EM algorithm, and the forgetful EM algorithm.

15. The method of claim 1, wherein the method is performed by execution of a computer program by a processor from a computer-readable medium.

16. A method for determining a target block size for partitioning incomplete data into a number of blocks of substantially the same size for an incremental-type expectation maximization (EM) algorithm performed to model the incomplete data, the method comprising:

determining initial model parameters;

initializing a new block size; and, repeating:
   setting a current block size to the new block size;
   determining current model parameters based on partitioning the incomplete data into a number of blocks of a size substantially equal to the current block size;
   determining a speed change that results from using the current model parameters with the incremental-type EM algorithm as compared to the initial model parameters with the incremental-type EM algorithm;
   setting the target block size to the current block size if the speed change corresponds to a greatest speed increase determined so far;
   redetermining the new block size;
   resetting the initial model parameters, until the new block size substantially equals the current block size.

17. The method of claim 16, wherein determining the current model parameters includes determining one of: a Q-function, and a plurality of incremental Q-functions (IQ-functions).

18. The method of claim 17, wherein setting the target block size to the current block size if the speed change is the greatest speed increase determined so far includes setting a plurality of actual functions to the one of the Q-function and the plurality of IQ-functions, the plurality of actual functions to be used in subsequent performance of the incremental-type EM algorithm.

19. The method of claim 16, wherein determining the speed increase comprises determining a ratio of a function using the current model parameters minus the function using the initial model parameters over a running time for determining the current model parameters minus a running for determining the initial model parameters.

20. The method of claim 16, wherein the current model parameters are determined by performing a single pass through the incomplete data.

21. The method of claim 16, wherein the current model parameters are determined by performing a number of passes through the incomplete data.

22. The method of claim 16, wherein the current model parameters are determined by iterating through the incomplete data until a convergence criterion has been satisfied.

23. The method of claim 16, wherein the current model parameters are determined by using a sample of the incomplete data larger than the target block size.

24. The method of claim 16, wherein the number of blocks, except a last block of the number of blocks, has the target block size, and the last block has a size less than the target block size.

25. The method of claim 16, wherein the incremental-type EM algorithm is one of: the incremental EM algorithm, and the forgetful EM algorithm.

26. The method of claim 16, wherein the method is performed by execution of a computer program by a processor from a computer-readable medium.

27. A method for modeling incomplete data using an incremental-type expectation maximization (EM) algorithm comprising:

determining initial model parameters and recording an initial the as a running the for determining the initial model parameters;

initializing a new block size and a plurality of temporary algorithm functions selected as one of: a temporary Q-function, and a plurality of temporary incremental Q-functions (IQ-functions);

repeating:
   setting a current block size to the new block size;
   determining current model parameters based on partitioning the incomplete data into a number of blocks of a size substantially equal to the current block size, including determining the plurality of temporary algorithm functions, and recording a current time as a running time for determining the current model parameters;
   determining a ratio of a function using the current model parameters conditional on the incomplete data minus an initial function using the initial model parameters conditional on the incomplete data over the current time minus the initial time;
   setting a plurality of actual algorithm functions as the plurality of temporary algorithm functions if the ratio is a greatest radio determined so far;
   redetermining the new block size;
   resetting the initial model parameters, until the new block size substantially equals the current block size; and, performing the incremental-type EM algorithm to subsequent model parameters based on the plurality of actual algorithm functions for modeling the incomplete data.

28. The method of claim 27, wherein the incremental-type EM algorithm is the incremental EM algorithm, and the pluralities of actual and temporary algorithm functions are pluralities of IQ-functions.

29. The method of claim 27, wherein the incremental-type EM algorithm is the forgetful EM algorithm, and the pluralities of actual and temporary algorithm functions are Q-functions.

30. The method of claim 27, wherein the current model parameters are determined by performing a single pass through the incomplete data.

31. The method of claim 27, wherein the current model parameters are determined by performing a number of passes through the incomplete data.

32. The method of claim 27, wherein the current model parameters are determined by iterating through the incomplete data until a convergence criterion has been satisfied.

33. The method of claim 27, wherein the current model parameters are determined by using a sample of the incomplete data larger than the target block size.

34. The method of claim 27, wherein the number of blocks, except a last block of the number of blocks, has the target block size, and the last block has a size less than the target block size.

35. The method of claim 27, wherein the method is performed by execution of a computer program by a processor from a computer-readable medium.

* * * * *